United States Patent [19]
Grote et al.

[11] Patent Number: 5,195,308
[45] Date of Patent: Mar. 23, 1993

[54] MOWER HAVING FLUID DISPERSION CHARACTERISTICS

[75] Inventors: Douglas E. Grote, McDonough; Richard Schaff, Conyers; Beth A. Logue, Jonesboro, all of Ga.; Terry Mitchell, Jenison; Todd A. Sutton, Grand Rapids, both of Mich.

[73] Assignee: Fuqua Industries, McDonough, Ga.

[21] Appl. No.: 758,845

[22] Filed: Sep. 13, 1991

[51] Int. Cl.$^5$ .................... A01D 34/82; B05B 9/04
[52] U.S. Cl. .................... 56/16.4; 56/16.8; 56/16.9; 239/172
[58] Field of Search ............ 56/16.4, 16.8, 16.9; 239/172, 289

[56] References Cited

U.S. PATENT DOCUMENTS

| | | |
|---|---|---|
| 2,044,884 | 6/1936 | Keller . |
| 2,573,784 | 11/1951 | Asbury . |
| 2,721,416 | 10/1955 | Perry . |
| 2,737,340 | 3/1956 | Bonini . |
| 2,847,224 | 8/1958 | Stout . |
| 2,865,671 | 12/1958 | Jensen . |
| 2,878,633 | 3/1959 | Mullin . |
| 2,939,636 | 6/1960 | Mullin . |
| 2,966,023 | 12/1960 | Carpenter . |
| 3,021,983 | 2/1962 | Blocksom . |
| 3,023,562 | 3/1962 | Slack . |
| 3,140,574 | 7/1964 | Brown, Jr. . |
| 3,332,221 | 7/1967 | McCain . |
| 3,334,457 | 8/1967 | Danisch . |
| 3,338,524 | 8/1967 | Rhein et al. . |
| 3,359,710 | 12/1967 | Anderson . |
| 3,375,644 | 4/1968 | Harper . |
| 3,405,514 | 10/1968 | Pulrang . |
| 3,477,212 | 11/1969 | Coffman . |
| 3,534,533 | 10/1970 | Luoma . |
| 3,722,820 | 3/1973 | Klint, Jr. ............... 239/129 |
| 3,857,515 | 12/1974 | Zennie ................. 239/169 |
| 3,942,308 | 3/1976 | Vicendese et al. .......... 56/16.8 |
| 3,982,697 | 9/1976 | Maples ................. 239/289 |
| 4,327,541 | 5/1982 | Emory ................. 56/16.8 |
| 4,821,959 | 4/1989 | Browning ............... 239/121 |
| 4,893,751 | 1/1990 | Armstrong ............ 239/172 X |
| 5,106,020 | 4/1992 | Harrell ............... 239/172 X |

Primary Examiner—Terry Lee Melius
Attorney, Agent, or Firm—Jones & Askew

[57] ABSTRACT

A cost- and labor-effective, efficient, safe, and easy-to-use lawn care apparatus is provided. The apparatus can not only cut grass as known in the art but can also be used to dispense liquid either behind its cutting path or by a manually directed wand. A tank agitation feature period continuous intermixing of the tank.

5 Claims, 2 Drawing Sheets

MOWER HAVING FLUID DISPERSION CHARACTERISTICS

TECHNICAL FIELD

This invention relates in general to grass or other growth treatment, and particularly relates to a riding lawn mower which not only cuts grass, but may also be used to provide fertilization, thatch or weed control by means of a liquid applicator system incorporated into the the riding mower. This multi-function capability is extremely advantageous in that the lawn mower can serve as a complete lawn care system. In one mode, mulching blades may be used in conjunction with the spraying of a composting accelerating liquid in a single-step process, without the need for cutting/mulching by liquid application.

BACKGROUND OF THE INVENTION

In lawn or other growth treatment, it is known to provide and use lawn cutting devices such as walk-behind or riding mowers, which typically use one or more shielded rotating cutter blades which cut grass or other growth to a desired height.

In lawn or other growth treatment, it is also known to provide liquid treatment systems in which liquid may be applied to act as an insecticide, herbicide, fertilizer, compost accelerator, or other agent.

However, there still exists a need for a cost- and labor-effective, efficient, safe, and easy-to-use lawn care apparatus which may be used by beginner and expert alike to not only cut grass but also to provide liquid application to the grass before, during, or after the cutting process.

SUMMARY OF THE INVENTION

The present invention solves deficiencies in the prior art by providing a cost- and labor-effective, efficient, safe, and easy-to-use lawn care apparatus. The apparatus can not only cut grass as known in the art but can also be used to dispense liquid either behind its cutting path or by a manually directed wand. The liquid can be an insecticide, herbicide, fertilizer, compost accelerator, or other agent.

Therefore, it is an object of the present invention to provide a complete lawn care system by the use of a conventional lawn mower.

It is a further object of the present invention to provide a riding lawn mower having a fluid dispersion feature which is simple and easy to use.

It is a further object of the present invention to provide a riding lawn mower having a fluid dispersion feature which is simple and easy to refill.

It is a further object of the present to provide a riding lawn mower having a fluid dispersion feature which is safe to operate.

It is a further object of the present invention to provide a riding lawn mower having a fluid dispersion feature which is safe to refill.

It is a further object of the present invention to provide a riding lawn mower having fluid dispersion behind the cutting path.

It is a further object of the present invention to provide a riding lawn mower having fluid dispersion by means of a manually directed wand.

It is a further object of the present invention to provide a riding lawn mower having a fluid dispersion system which is easy to clean.

It is a further object of the present invention to provide a riding lawn mower having a fluid dispersion system which is resistant to corrosion.

It is a further object of the present invention to provide a riding lawn mower having a fluid dispersion system which is accurate and provides minimal waste.

It is a further object of the present invention to provide a riding lawn mower having a fluid dispersion system which reduces spray drift.

Other objects, features, and advantages of the present invention will become apparent upon reading the following detailed description of the preferred embodiment of invention when taken in conjunction with the drawing and the appended claims.

DETAILED DESCRIPTION OF THE PREFERRED EMBODIMENT

General Operation/Configuration

Figure 1:
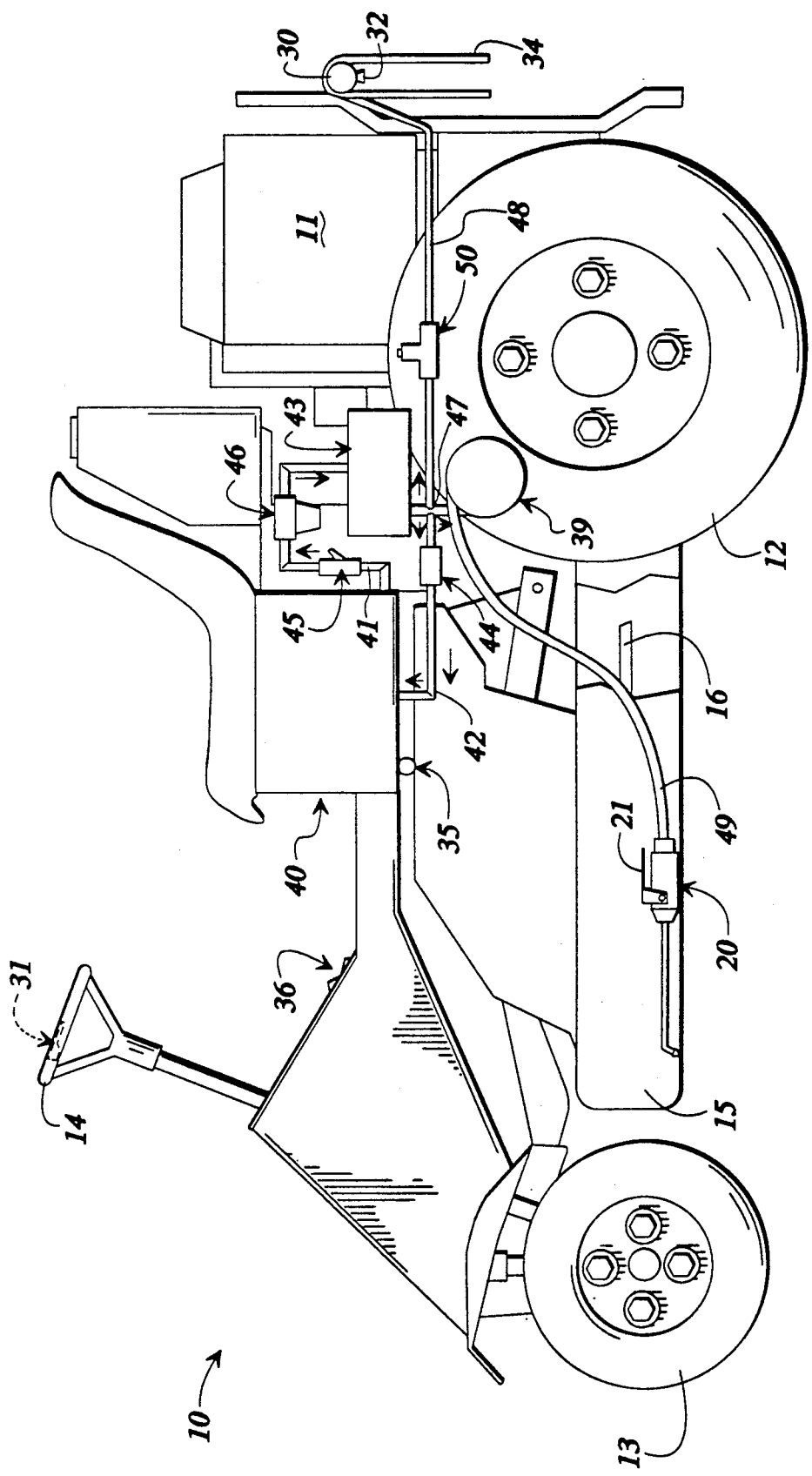
FIG. 1 is a side view of a riding lawn mower having a liquid application system incorporated therein.

Generally described, the riding mower 10 shown in FIG. 1 includes a liquid dispersion system including a handheld wand 20 (shown in a mounted position) and a rear mounted spray boom 30, each configured to disperse a liquid from a storage tank 40. Activation of a wand trigger 21 on the wand 20 causes liquid to be sprayed from the wand 20. Activation of a boom trigger 31 (attached to the steering handle 14) causes liquid to be sprayed from the boom 30.

Detailed Construction

The riding lawn mower 10 includes a gasoline drive motor 11, which drives a pair of rear wheels 12. A pair of front wheels 13 are steerable by means of a steering handle 14. A cutter housing 15 is suspended below the frame of the mower 10, and conceals one or more cutting blades 16. The cutting blades are also driven by the motor 11 to provide a grass cutting action such as known in the art.

The dispensing system includes a storage tank 40 for mixing and holding the treatment liquid. The tank may be sized to provide approximately one hour of spraying time, although other sizes are contemplated within the spirit and scope of the present invention.

As discussed in detail further below, the tank 40 provides a mixing area for treatment ingredients and water. The tank can be a 5-gallon tank molded from black polyethylene to preferably provide enough volume for one-half hour of spraying time. If shorter spraying times are desired, the tank can be filled to an appropriate indicator on a sight tube. The shape of the tank is being designed for functionality, but may look like an integral part of the mower. Also, there is drain spigot 35 to empty the tank for cleaning. A low liquid lever light (not shown) may also be provided.

Two fluid lines are attached to the storage tank, a tank exit line 41 and a tank agitation line 42. The tank exit line 41 allows fluid flow intermediate the tank 40 and a fluid pump 43. In line with the tank exit line are a shut-off valve 45 and a strainer 46.

The shut-off valve 45 is a quarter turn manual ball valve made from polypropylene for chemical resistance. The shut-off valve 45 provides a means of shutting off flow from the tank to allow system components to be repaired or replaced. The strainer 46 is of compact size and preferably constructed of polypropylene for chemical resistance. Its function is to remove foreign material to protect system components and prevent clogging of the nozzles.

The fluid pump 43 is electrically driven from a 12-volt, direct current battery such as those typically used in such mowers. As discussed in further detail below, the pump 43 provides constant, positive pressure to pump fluid to the dispensing nozzles, hand sprayer, and the jet agitator.

The pump 43 is self priming, sealess, and can run dry for extended periods. It has a built-in internal recirculating bypass to protect it and the associated system from excessive pressure. Wetted parts are made from polypropylene and santoprene for enhanced chemical resistance. The preferred pump generates 30 psi of pressure at a flow rate of up to 2.0 GPM, although other configurations are contemplated under the spirit and scope of the present invention. The 30 psi of line pressure provides the proper discharge rate at the nozzles and the 2.0 GPM proves enough flow for both the agitator line, the spray nozzles and hand sprayer, as discussed in further detail below.

The "pressure" side of the pump 43 is connected by tubing such as known in the art to a three-way diverter 47, which supplies three fluid lines, a boom supply line 48, a wand supply line 49 and the previously discussed tank agitation line 42.

Intermediate the three-way diverter 47 and the tank 40, in the tank agitation line 42, is an in line flow control valve 44. This valve may be adjustable, or may be preset. This valve 44 restricts flow to a level which will provide desired agitation of the tank contents, but will not starve the other lines 48, 49. Tank agitation is desirable to ensure a consistent mixture, especially when the liquid includes suspended particulates.

Figure 3:
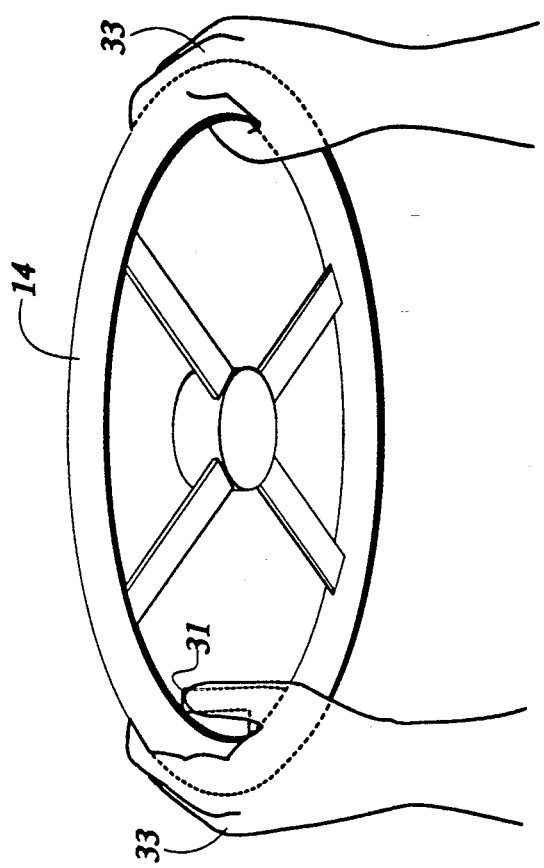
FIG. 3 is a driver's-eye view of the steering handle of the mower of FIG. 1, with the steering handle being shown in isolation and with an rear boom applicator trigger attached thereto.

The boom supply line 48 has an in line electrically-energized solenoid cutoff valve 50 which is normally closed. This valve is energized to an open position by the closing of the previously-introduced normally-open boom trigger switch 31 attached the steering wheel 14, in a conveniently located position (see also FIG. 3) which allows the operator 33 to depress the switch 31 while maintaining control of the mower. The switch 31 may include a finger operated lock (not shown) to lock the switch 31 in a depressed position. In another embodiment, the switch 31 could be foot activated. The boom supply line attaches to a fluid-dispensing boom 30 attached to the rear of the mower.

Figure 2:
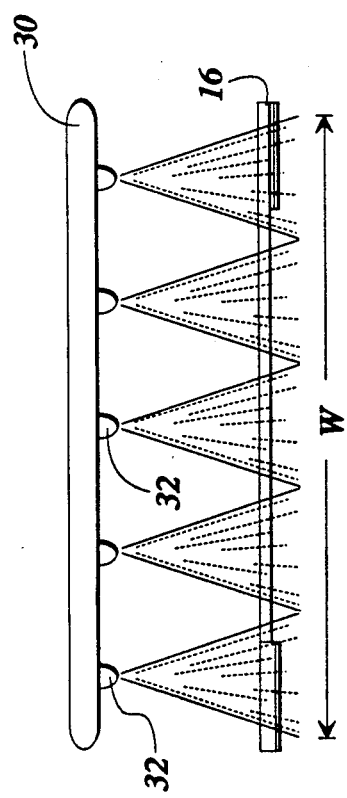
FIG. 2 is an illustrative view illustrating the preferred matching of the blade cutting path with the boom spraying path.

Referring now also to FIG. 2, the boom 30 includes a plurality of downwardly-directed spray nozzles 32, which are configured to cooperate such that a uniform flat spray pattern is provided across a spray path having a width approximating the cutting width of the blade 16. The spray nozzles 32 have an integral check valve for drip-free shutoff. The nozzle positions may be fully adjustable to vary the spray width for different size mower decks, or may be fixed if to be used with only one size deck.

Nozzle bodies are preferably molded of nylon and the caps are made from acetal. The line pressure at the nozzles may be approximately 25 psi, which equates to a total or combined discharge rate of 0.17 GPM.

The boom 30 is covered by a downwardly-directed, U-shaped boom shield 34 which preferably allows for effective spraying by the boom, but also prevents errant spray which may be caused by windy conditions. Such errant spray is undesirable in that the spray, while having an advantageous effect on the treated lawn surface, may have a caustic effect on the apparatus itself, or may have an undesirable effect upon the operator.

The wand sprayer 20 is such as those known in the art, and is attached to the three-way diverter 47 by a quick-disconnect configuration such as those known in the art. This unit is preferably lightweight and may be used for spot spraying. It may be constructed of polypropylene for chemical resistance and durability, have a trigger lock to permit locking its valve in an open position for continuous flow, and include a built-in strainer and adjustable spray tip.

The wand sprayer line 49 includes a take-up reel 39 such as those known in the art, which allows the wand 20 to be easily manipulated as desired, while minimizing line entanglement and damage risk. A wand holster or other storage device (not shown) may also be provided to store the wand.

General discussion of operation of the apparatus described above is now made. Firstly, power to the pump motor is controlled by a dedicated switch 36 located on the mower console. Upon energizing the motor, assuming the triggers 21, 31 are not depressed, the only fluid flow path will be a recirculating path from the tank, through line 41, through the pump 43, and through the agitation line 42. This is especially preferable upon startup if particulates have become settled in the tank.

It may understood that at this point, the fluid lines 48, 49, are pressurized only up to a certain point, the boom supply line 48 being pressurized up to the cutoff valve 50 (which is controlled by the boom trigger 31), and the wand supply line pressurized all the way up to the valve controlled by the wand trigger 21. Therefore, it may understood that activation of the trigger 21 causes pressurized dispersion of fluid through wand 20, and activation of the trigger 31 causes pressurized dispersion of fluid through boom 30. Depending on the dexterity of the operator, both triggers 21, 31, and be activated to facilitate fluid dispersion through both the wand 20 and the boom.

Operation

One significant advantage of the present invention is that it provides an apparatus which is easy to use. The following steps outline preferred operational procedure.

Step 1 Fill the water tank.

Step 2 Insert a treatment container (not shown) into a recessed pocket (not shown) in the water tank. Upon insertion, the treatment container's seal (not shown) is automatically broken to dispense the ingredients. This manner of mixing is extremely simple.

Step 3 Turn the system switch to "on", which starts the pump and activates the jet agitation to mix the treatment ingredients with the water.

Step 4 When desired, depress the switch located on the steering wheel. As long as the switch is held down, treatment is applied. Releasing the switch allows the operator to treat only selected areas. It may be understood that it is not necessary that the mower be cutting; it is entirely possible that the dispensing feature of the mower be used without cutting, considering the advantages of providing a evenly-dispersed liquid at a controlled speed.

Step 5 To clean the dispensing system, add fresh water to the tank and run the sprayer for a few minutes.

Optional

Step 6 To dispense through the wand sprayer 20, plug the sprayer into the quick disconnect outlet (not shown, but intermediate the 3-way diverter 47 and the wand fluid supply line 49) and pull the sprayer trigger. This may be used if liquid is desired to be applied to areas unreachable by the mower.

Alternatives

Instead of providing a single tank, multiple tanks are contemplated, with two or more tanks linked to mix their respective liquids in a mixing tank just prior to entering the pump.

A variable pump pressure is also contemplated to control the fluid application rate. Also contemplated is variation of the mix ratio, and physically changing the nozzle size.

A mechanically driven pump is also contemplated, which may be used with a pressure accumulator.

A valve is also contemplated which diverts fluid either to the wand or the boom, but not to both.

The Fluid Mixture

As discussed above, the fluid applied may be an insecticide, herbicide, fertilizer, compost accelerator, or other agent. The liquid treatments are preferably formulated for slow application over long periods of time, so moderate variations in the application rate due to changes in mowing speed or passing over the same area more than once, will provide minimal, if any, damage to the lawn.

The special treatment ingredients will be offered in user friendly, premixed modules. These modules will be configured to be mounted to the tank 40 such that upon mounting, the contents will be emptied into the tank via a ruptured seal. Alternately, the consumer could be instructed to empty an entire module into a tank full of water.

Conclusion

Therefore, it may be seen that the above-described lawn care system solves deficiencies in the prior art by providing a cost- and labor-effective, efficient, safe, and easy-to-use lawn care apparatus. The apparatus can not only cut grass as known in the art but can also be used to dispense liquid either behind its cutting path or by a manually directed wand.

If the lawn mower is adapted for use with mulching blades, a compost accelerator may be use. If the lawn mower is using conventional cutting blades, a weed controlling spray may be used. Other combinations of cutting blades and liquid applications are used.

While this invention has been described in specific detail with reference to the disclosed embodiments, it will be understood that many variations and modifications may be effected within the spirit and scope of the invention as described in the appended claims.

What is claimed is:

1. An apparatus for cutting grass blades extending above a ground surface and subsequently applying a liquid to said blades, comprising:
   a frame means;
   cutting means attached to said frame for cutting grass blades:
   spray means attached to said frame for directing a spray of liquid downwardly toward said grass blades;
   a manual steering handle for allowing an operator to manually steer said apparatus along a path atop said ground surface by means of manually gripping said handle by a combination of palm and fingers of a first hand; and
   thumb trigger means attached to said manual steering handle to allow an operator to selectively spray, by said spray means, grass blades which have been cut by said cutting means, by depressing said trigger with the thumb of said first hand without changing the position of said first hand from said steering position.

2. The apparatus as claimed in claim 1, further comprising:
   a storage tank for feeding said spray means; and
   agitation means for agitating the contents of said tank.

3. The apparatus as claimed in claim 1, wherein said spray means is a hollow boom attached to the rear of said frame means.

4. The apparatus as claimed in claim 2, further comprising a hood means over said boom for discouraging errant spray due to wind.

5. The apparatus as claimed in claim 1, wherein said spray means is a boom sprayer attached to the rear of said frame, and further comprising a wand sprayer for spraying fluid independent of said boom sprayer.

* * * * *